UNITED STATES PATENT OFFICE.

JOSEPH KOETSCHET AND MAURICE BEUDET, OF LYON, FRANCE, ASSIGNORS TO SOCIETE CHIMIQUE DES USINES DU RHONE, ANCIENNEMENT GILLIARD, P. MONNET ET CARTIER, OF PARIS, FRANCE.

MANUFACTURE OF ETHYLIDENE DIACETATE.

1,306,964.          Specification of Letters Patent.      Patented June 17, 1919.

No Drawing.      Application filed December 7, 1917.   Serial No. 206,124.

*To all whom it may concern:*

Be it known that we, JOSEPH KOETSCHET, a citizen of the Swiss Republic, of 67 Boulevard des Belges, Lyon, France, and MAURICE BEUDET, a citizen of the Republic of France, of 25 Rue Bugeaud, Lyon, France, have invented certain new and useful Improvements in the Manufacture of Ethylidene Diacetate, of which the following is a specification.

It is known from German Patent No. 271381 that ethylidene diacetate can be prepared by causing acetylene to react with glacial acetic acid in presence of sulfate or phosphate of mercury.

It has been found that this reaction takes place in a very efficient manner with sulfate of mercury; in order to accelerate the fixation of the acetylene however, working at about 90° C. is necessary. At this high temperature there is a pretty intense formation of tar, and moreover the ethylidene diacetate undergoes appreciable splitting up owing to the sulfuric acid liberated by decomposition of the catalyzer.

All the other mineral acid salts of mercury act incomparably less well than the sulfate. In particular the phosphate (the only salt besides sulfate cited in the patent) has absolutely no action. It is the same with the chlorids of mercury.

The specification of the patent states further that the reaction can be facilitated by adding mineral acids or acid salts to the catalyzer. Experiments made in this sense, however, have shown that only sufuric acid produced an appreciable effect, on lowering the temperature of reaction, but that this addition had the serious disadvantage of considerably reducing the yield.

All this shows that the reaction is far from having the general character attributed to it by the German patent.

Now we have found that all the above drawbacks can be obviated by replacing the sulfate of mercury by sulfonic acids in presence of acetate of mercury.

The aromatic sulfonic acids (benzenesulfonic, naphthenesulfonic, camphenesulfonic) catalyze the reaction perfectly. The use of the aliphatic sulfonic acids (sulfacetic acid, methionic acid, etc.,) may however, be especially insisted upon.

Example 1: 40 parts of oxid of mercury are dissolved in 800 parts of acetic acid, raised to about 70° C., and then while stirring, there is added in a slender stream a hot solution of—

Beta-naphthenesulfonic acid____ 50 parts.
In acetic acid_____ 200 parts.

A white precipitate of naphthenesulfonate of mercury is formed.

In the mixture thus obtained 200 parts of acetylene are absorbed during a period of 2 hours at 70° C.

The excess of acetic acid is then separated by the known processes from the diacetate formed.

Example 2: 40 parts of oxid of mercury are dissolved in 1000 parts of glacial acetic acid raised to 70° C. Into this solution is run the following mixture:—

Sulfacetic acid_____ 26 parts.
Acetic acid_____ 100 parts.

230 parts of acetylene are fixed on the acetic acid in a period of 5 hours at 65° C.

At the end of the operation the mixture of diacetate and acetic acid obtained is very little colored and perfectly limpid.

What we claim and desire to secure by Letters Patent is:

1. A process of producing ethylidene diacetate by the action of acetylene on acetic acid, characterized in that the treatment takes place in presence of a sulfonic acid and acetate of mercury.

2. A process of producing ethylidene diacetate by the action of acetylene on acetic acid, characterized in that the treatment takes place in presence of an aromatic sulfonic acid and acetate of mercury.

3. A process of producing ethylidene diacetate by the action of acetylene on acetic acid, characterized in that the treatment takes place in presence of benzenesulfonic acid and acetate of mercury.

In testimony whereof we have signed our names to this specification.

JOSEPH KOETSCHET.
MAURICE BEUDET.

Witnesses:
E. ESCHER,
MARIN KACHON.